United States Patent [19]

Mock et al.

[11] 4,037,470
[45] July 26, 1977

[54] METHOD AND APPARATUS FOR MEASURING HIGH ENERGY LASER BEAM POWER

[75] Inventors: Kenneth John Mock, Inglewood; Joseph Daniel Mozic, Playa Del Rey, both of Calif.

[73] Assignee: The United States of America as represented by the Secretary of the Navy, Washington, D.C.

[21] Appl. No.: 715,776

[22] Filed: Aug. 19, 1976

[51] Int. Cl.² .......................................... G01K 17/00
[52] U.S. Cl. ................................................ 73/190 EW
[58] Field of Search ............. 73/190 H, 190 EW, 355, 73/DIG. 7; 250/349, 352

[56] References Cited

U.S. PATENT DOCUMENTS

| | | | |
|---|---|---|---|
| 3,464,264 | 9/1969 | Ehrlich et al. | 73/190 |
| 3,561,265 | 2/1971 | Schmidt | 73/190 |
| 3,783,685 | 1/1974 | Zeiders et al. | 73/190 |
| 3,918,303 | 11/1975 | Zakhidov | 73/190 |

Primary Examiner—Herbert Goldstein
Attorney, Agent, or Firm—Richard S. Sciascia; Paul N. Critchlow

[57] ABSTRACT

A hollow spherical casing is provided with an inlet opening for admitting the full intensity of the laser beam. A primary substrate formed of a bank of small tubes is mounted in the sphere to intercept the beam. The tubes partially reflect the beam and also conduct a predetermined fraction of the beam intensity into a water coolant. Beam reflections are evenly distributed over the sphere's interior surface by the tube geometry and the sphere applies the reflected beam energy to a surrounding coolant. Temperature measurements are made for both coolants. The predetermined fraction of the energy applied to the primary substrate coolant is a function of the amount of heat needed to produce a substantially instantaneous heat flux time constant that permits a substantially instantaneous measurement of beam power. Integration of the measurements derived from both the tube and the sphere coolants provides a self-calibration capability.

16 Claims, 10 Drawing Figures

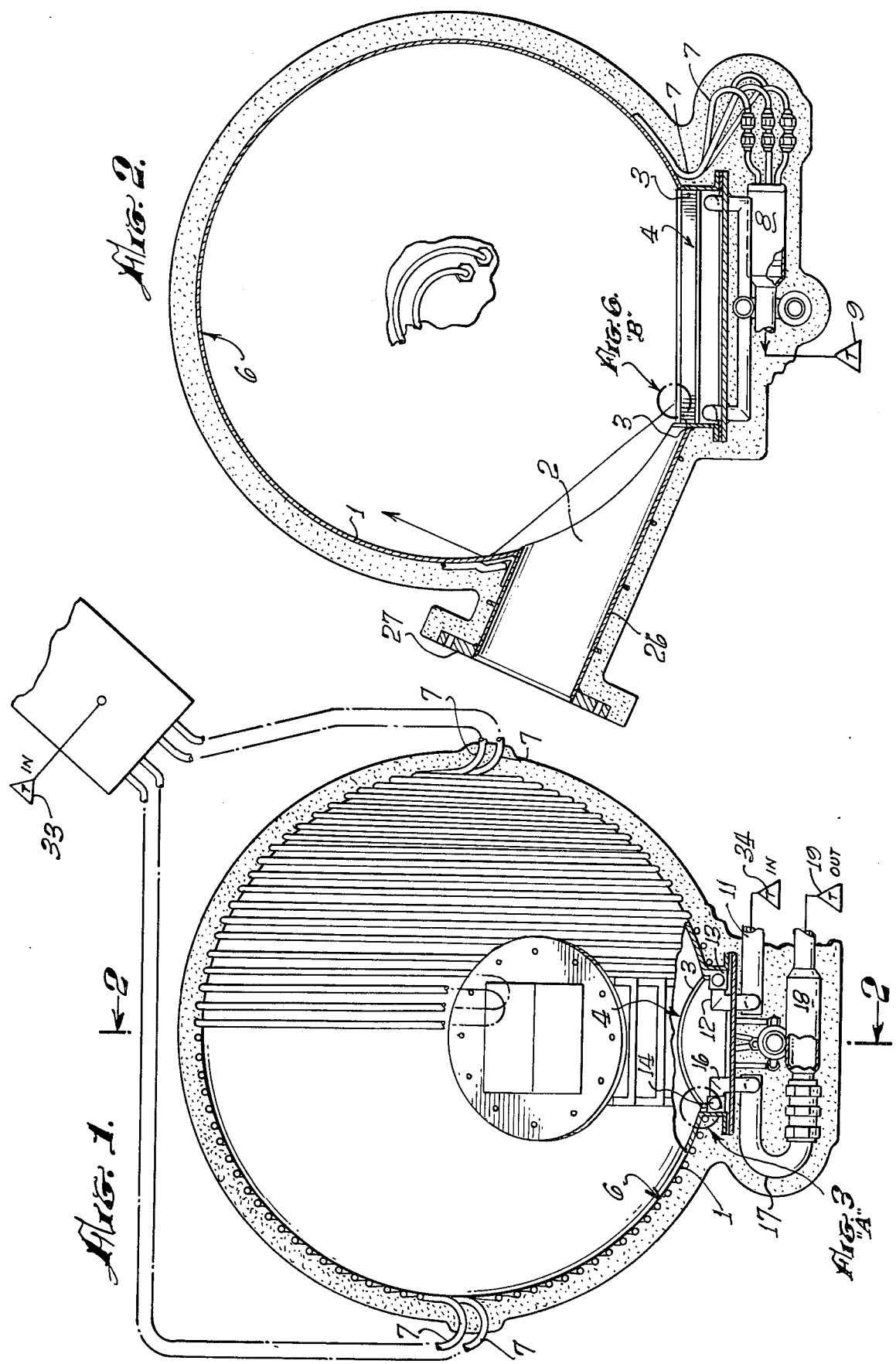

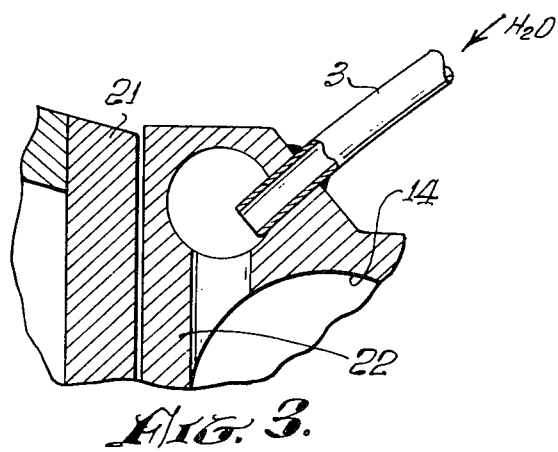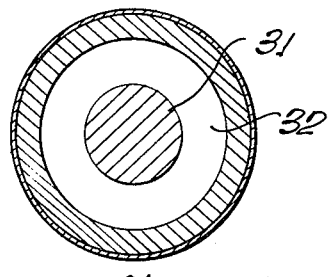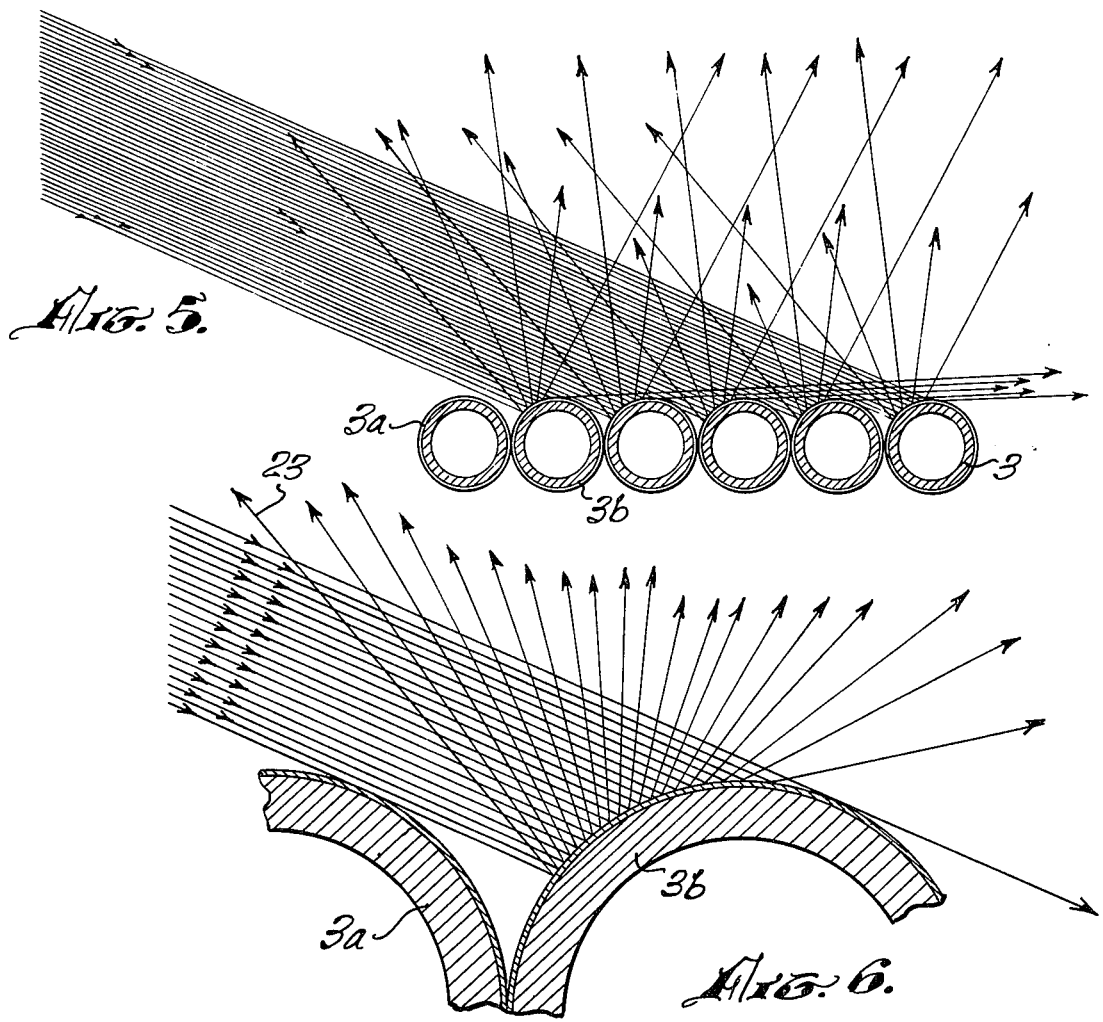

4,037,470

METHOD AND APPARATUS FOR MEASURING HIGH ENERGY LASER BEAM POWER

BACKGROUND OF THE INVENTION

The present invention relates to calorimetry and, in particular, to calorimetric systems for measuring the power of high energy laser beams.

Although the present invention is concerned primarily with the measurement of high energy laser beam power, its principles will be found useful in lower energy applications or for other comparable types of beams. In general, laser beam power measurements are made both for diagnostic and for operational purposes. For example, an operational shipboard laser system, such as a system used by intercept heat-seeking missiles, operates at a very high energy level and, to assure effectiveness, it is important to be able to determine at any given instant the power or intensity of the output beam. Conventional systems have not proven suitable for such uses. For one reason, they frequently depend on water cooling to protect the various reflectors and heat exchangers and, unfortunately, conventional cooling arrangements are characterized by having an unacceptably low thermal response time or, in other words, a slow temperature-rise time constant. Further, when the most commonly used systems are scaled upwardly for the higher power levels, they become excessively large and their thermal response time increases with their size and mass.

To avoid such difficulties some arrangements employ a technique in which reflectors are exposed to only a slice of the full beam intensity. Such techniques have the advantage of providing continuous measurement information without disrupting laser beam operation, but their measurements have not been found to be consistently reliable. The problem is that in any cross-sectional area of the beam there may be temporal intensity variations or fluctuations so that any particular slice or sample of this cross-section may not truly represent beam power. A continuously-operable instrument that also is capable of receiving the full beam as opposed to a beam sample, is, as far as is known, an unrealized goal. Most operational systems, consequently, utilize a technique in which the full beam is switched rapidly into the measuring instrument and away from its target. When such a technique is used, there is a need for very rapid thermal responses to minimize the off-time of the beam.

Other difficulties experienced in full-beam measuring devices involve such matters as the ability to avoid the potential danger and feedbacks to the laser and, in particular, the need for insuring reliability and effectiveness of the beam through accurate calibration procedures. As will become apparent, the present arrangement provides a calibrating capability which, coupled to its almost instantaneous thermal response time, permits immediate changes which assure constant effectiveness.

SUMMARY OF THE INVENTION

The full beam intensity is directed onto a tubular substrate which conducts a particular, predetermined fraction of the energy as a heat input into a coolant which, preferably, flows through the tubular passages. The balance of the beam is reflected by the substrate and, most suitably, captured by a spherical, secondary, water-cooled substrate. The pre-determined fraction is a function of the intensity of the beam, as well as the heat input needed to produce a substantially instantaneous temperature rise in the coolant within the tubular passages. A closely-related consideration is that the coolant passages are small to permit a substantially instantaneous thermal response. A measurement of the temperature provides immediate information accurately representing the full beam power.

In the preferred form the secondary spherical substrate provides a slower thermal response which, when integrated with the primary measurement, permits an accurate determination to be made as to the fraction of the energy which actually, during a particular run, was absorbed by the coolant. Comparison of the actual with the pre-determined or designed fraction provides a self-calibrating capability.

A primary object of the invention is to provide an arrangement capable of providing almost instantaneous measurement of the power in a high energy laser beam. A related object is to provide this capability in an instrument that receives the full cross-sectional area of the beam.

Another object is to provide a beam-measuring instrument that is self-calibrating.

A further object is to provide that a laser beam measuring instrument in which the geometry protects the laser against reflective feedbacks and, additionally, protects the beam-exposed elements against high energy damage.

Other objects and their attendant advantages will become more apparent in the ensuing description.

BRIEF DESCRIPTION OF THE DRAWINGS

The present invention is illustrated in the accompanying drawings of which:

FIG. 1 is a somewhat diagramatic side view of the present spherical calorimeter showing its left-hand hemispherical portion in partial section;

FIG. 2 is a section taken along lines 2—2 of FIG. 1;

FIG. 3 is an enlarged view of the portion enclosed in circle A of FIG. 1;

FIG. 4 is an enlarged cross-sectional view of one of the tubes of a primary substrate of the calorimeter;

FIG. 5 is an enlarged operational view of a series of tubes illustrating certain desirable reflective characteristics;

FIG. 6 is an enlarged view of one of the tubes shown in FIG. 5;

DESCRIPTION OF THE PREFERRED EMBODIMENT

Figure 7:
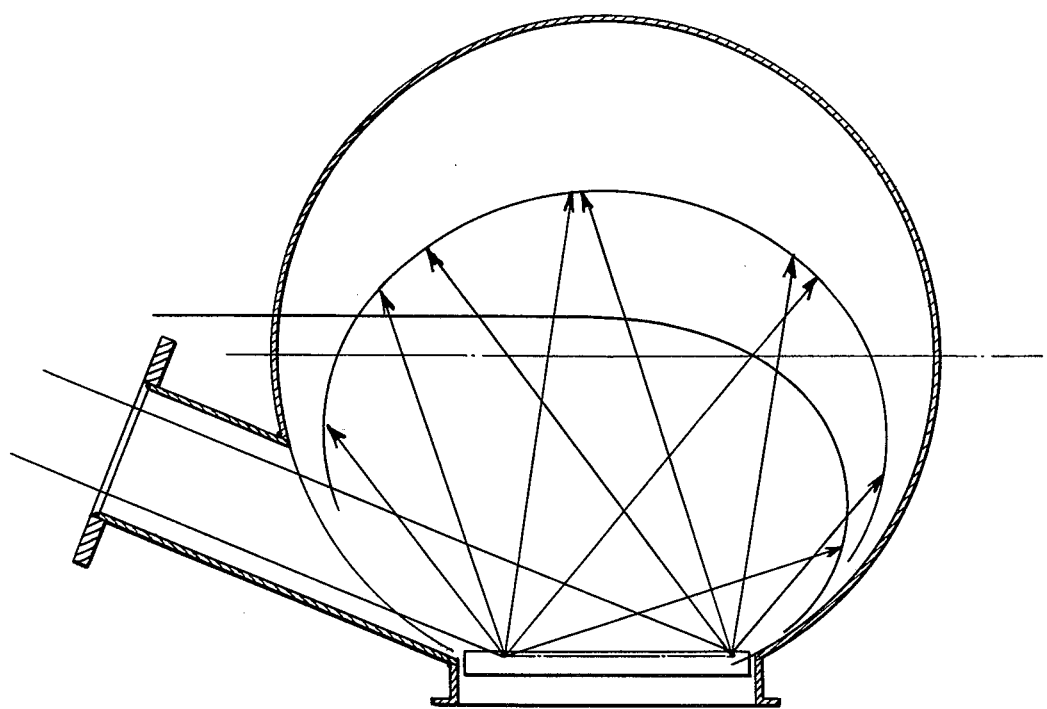
FIG. 7 is a sectional view somewhat similar to FIG. 2 showing a beam reflection pattern.

Referring to FIGS. 1 and 2, the major components of the present calorimeter include a spherical casing 1 formed of a thin copper sheet and provided with an aperture 2 for admitting the laser beam to the interior portion of the sphere. A bank of thin-walled tubes 3 is mounted in the bottom portion of the sphere in position to intercept the full cross sectional area of the beam admitted through aperture 2. For identification purposes, the bank of tubes will be referred to as a primary substrate 4 while the spherical casing is referred to as a secondary substrate 6. Both substrates are watercooled by passing a water coolant or the like through their tubular arrangements.

With regard to the spherical secondary substrate, its tubular arrangement includes plurality of tubes 7 each communicated at one of its ends to a water manifold having a known flow rate and each of the tubes is run about the perphery of the sphere one or more times. As shown, half of the tubes cool the right side hemisphere of the sphere, while the other half cool the left hand portion. The use of the plural number of tubes rather than a single continuous tube is preferred since the sphere is a relatively large 30 inches diameter component and a single, continuous coolant path would promote overheating. If smaller spheres are used a single, continuous path might be acceptable.

As shown in FIG. 2 each sphere tube or coil 7 has its effluent applied to a water mixer 8 in which the effluents are mixed to provide a representative uniform temperature. The obvious need for the mixer is due to the fact that the temperature rise or heat-pickup is not uniform for all coils. A thermo couple or other temperature-sensing device 9 records the uniform temperature achieved in mixer 8 to provide the data needed for the power determination.

The water cooling system for primary substrate 1 generally is provided by passing the water coolant through its tubes 3. As shown, a large number of thin-walled, small diameter, copper tubes, are disposed side-by-side in the crowned arcuate configuration shown in FIG. 2. Each tube is an individual elongate member extending arcuately and transversely relative to the path of the incoming beam. The purpose of this symmetrical arrangement is to reflect the beam in a particular pattern that will be described.

The water coolant supply for tubes 3 is through lines 11 and 12 into a manifold 13 which extends longitudinally the length of the bank of tubes. Each tube 3 receives its water supply from the manifold. The effluent is received by a similar manifold 14 from which it passes through line 16 and 17 into a mixer 18 to provide a uniform temperature measured by a thermo-couple 19. FIG. 3 is an enlargement showing in greater detail the manner in which the water flowing out of the tubes is fed into manifold 14. Other arrangements can be provided and, in fact, the entire primary substrate can be rearranged to suit whatever purposes are desired providing it functions in the manner which will be described. The mounting for the bank of tubes includes a bracket 21 (FIG. 3) supporting a manifold housing 22 which, in turn, supports the tubes. Preferably, the tubes are brazed to the walls of the housing openings into which they are fitted.

Figure 8:
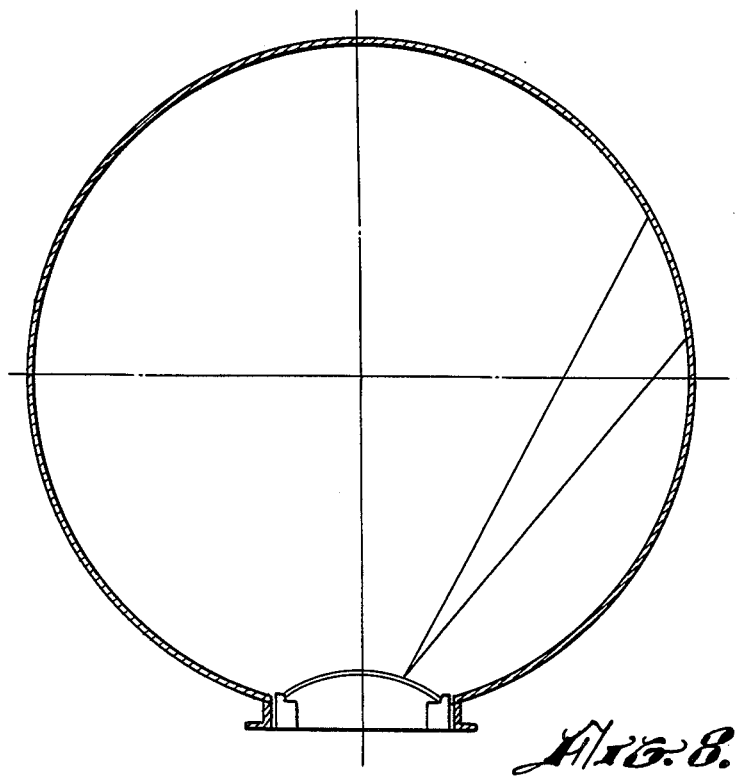
FIG. 8 is a section similar to FIG. 1 further illustrating the reflection pattern.

With regard to the function or operation of the device, it will be recognized that a high energy laser beam to be measured is directed through aperature 2 onto primary substrate 4 which absorbs a portion of the beam enetgy and reflects the balance of the beam onto secondary substrate 6. An important consideration is to assure that the reflected rays are distributed in an even pattern over the entire curvature of sphere 1 and, also, to assure that none of the specular reflections are permitted to be fed back to the laser through aperature 2. Scuh a feedback would occur if a specular reflection from a tube exited through the aperature. Even distribution is achieved to a large extent by the circular curvature of the tubes which spreads the reflected image of the beam onto a meridian band of the sphere as shown in FIGS. 5, 7 and 8. The obvious purpose is to diminish the individual beam intensities on the secondary so as to physically protect the secondary against energy concentrations which, due to the extremely high energy of the incoming beam, could be damaging. Also, as may be noted particularly in FIG. 8, the crown-like curvature of the primary bank of tubes further spreades the meridian band to distributively diminish the beam intensity.

The geometrical relationship which prevents feedback is illustrated in FIG. 2 as well as FIGS. 5, 6, and 7. As shown in FIG. 5, tube 3a can be considered as the first tube at the left hand end of the tube bank and, as shown in FIG. 2, the bank of tubes is so aligned relative to the path of the incoming laser beam that the beam does not reflect from tube 3a. The next tube 3b receives and reflects a portion of the incoming beam along the lines indicated in FIG. 5 as well as FIG. 6. The significant point is that the first reflection from tube 3b is at such an angle that it is captured by the interior surface of the sphere rather than permitted to exit through its aperature. This fact is illustrated in FIG. 2 in which the first reflection from tube 3b is identified by numeral 23.

The size or cross-sectional area of aperature 2 obviously is a factor to be considered. Preferably, its cross sectional area is approximately the same as that of the incoming beam. However, this feature is an optional one since, within some limits, the aperature can be sized to receive beams of different width or cross sectional areas. It also might be noted that aperature 2 actually is provided at 'the end of an inlet duct 26 which has a flange 27 at its outer end. Duct 26 is used since, in its presently implemented form, the instrument is intended to be used in a vacuum or, in other words, with the interior of the sphere evacuated. Flange 27 is coupled to the vacuum source and, to preserve the vacuum, a window of some transmissive material covers the duct. However, a simple aperature can be used and the instrument can operate satisfactorily in an atmospheric environment.

Also, in the preferred implementation, sphere 1 is a thin-walled copper member adapted to permit rapid transfer of the heat energy into its coolant. Further, the interior surface of sphere 1 can be roughened by grit-blasting and also blackened by surface treatment. The roughening and blackening assists absorptivity or heat exchange and minimizes reflections from it. As will be recognized the reflectivity up to this point primarily has been concerned with specular rays as opposed to the diffuse reflections which occur to varying degrees. Such diffuse reflections also should be captured by the sphere although it s recognized that a minor portion may escape. The geometry, however, should minimize the escape to improve the efficientcy of the measurement.

One of the principle features of the invention is the fact that the primary substrate arrangement is capable of providing almost instantaneous temperature measurements, or, in other words, the heat flux time constant of the primary coolant is so rapid that the laser beam power can be ascertained almost instantaneously. In particular, thermal response times in the order of 100 milliseconds are achieved. This response also provides a capability of recording transient laser conditions which, as far as is known, are achieved for the first time at the high power levels under consideration. The rapid thermal response results from a number of factors. First, as will be noted, tubes 3 are provided in large number and each tube has a small outer diameter in the order of 0.0625 OD. The large number of tubes provides a large surface area which assures that a significant fraction of the beam energy is absorbed and transmitted to the tube coolant while the small tube diameter assures extremely rapid temperature rise. By way of example, the illustrated embodiment includes about 209 tubes.

An important design consideration is to absorb a particular fraction of the beam energy which, for example, may be in the order of about 20%. The balance of the beam energy is to be reflected in the manner which has been described. Consequently, the outer surfaces of the tubes should be partially reflective as well as absorptive. Surface treatment can be achieved in various well-known manners such, for example, as by the use of very thin film platings or finishings of platinum, nickel, pure copper, etc. The film provides the desired degree of reflectivity and, as needed, it can be roughened to whatever degree is desired to increase its absorbtivity.

With regard to the tube size it might be noted that effectiveness is reduced if the tube diameter is too small. In fact, the 0.0625 OD which has been mentioned apparently is at the lower limit of the tube size. Larger tubes, such as that illustrated in FIG. 4 can be employed. However, when the larger tube is used, it is desired to reduce the amount of coolant and the width of its passage by employing a core member 31 which can be provided simply by the use of a brass rod. The use of such a brass rod attenuates the coolant passage and facilitates the rapid thermal response which is desired. In particular, it can be considered that the tube shown in FIG. 4 is a thin-walled member having a thickness of approximately 10 mil with coolant passage 32 approximately 20 mil.

Summarizing, the purpose of the primary substrate is to receive the full intensity of the entire laser beam and to absorb into its coolant a particular fraction of the beam energy which is sufficient to provide the unusually rapid thermal response. In this regard, with a flowing coolant having a particular volume and cross section, the fraction of the heat absorbed will determine to a significant degree the thermal response. The greater the amount of heat applied to the coolant, the faster the response will be. However, there obviously are limits to the amount of energy absorbed since excess energy can destroy the tubes. Consequently, within the limits imposed by maintaining physical integrity, the percentage of heat absorbed should be relatively high. As has been indicated, the use of a large number of quite small tubes safely achieves the desired results since each of the many tubes absorbs a relatively small amount of the beam energy which, nevertheless, is sufficient to almost instantaneously heat its small quantity of flowing coolant.

Figure 9:
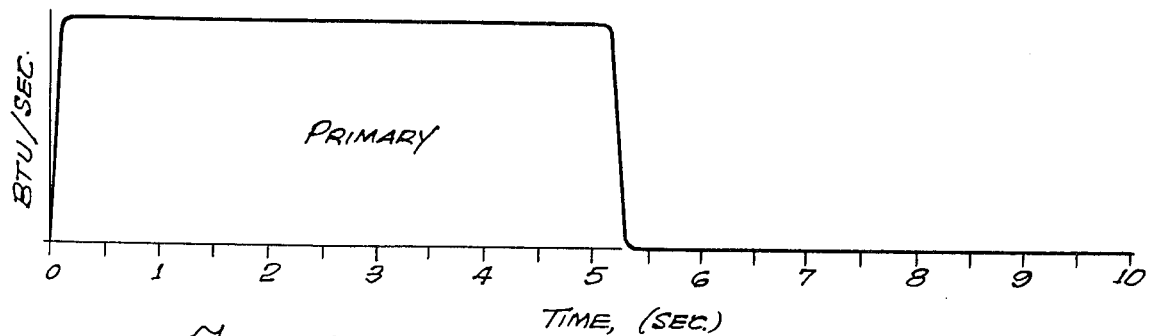
FIGS. 9 and 10 are test run thermal response plots.

FIG. 9 is a plot of heat flux versus time during a typical test run of about five seconds duration. The time constant as represented by the very rapid temperature rise at time zero, is almost instantaneous and in the order of 100 milliseconds. The BTU's, as measured by thermocouple 19, remain at the high level for the duration of the run following which there is a sharp drop-off to the zero level.

Figure 10:
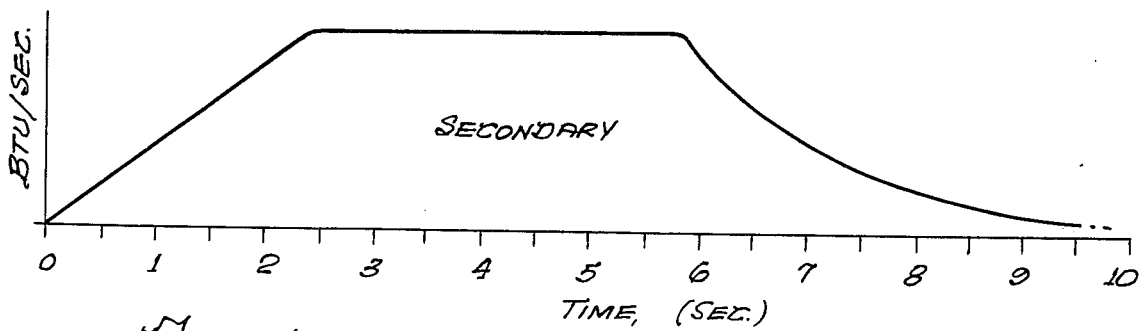

FIG. 10 is a similar plot showing the thermal response of the secondary substrate during the test run of 5 seconds. Its time constant or rate of temperature rise from time zero is much slower requiring over 2 seconds to reach the measured BTU level. This level is maintained for the balance of the run following which there is an exponential decay extending beyond the ten second point.

In a normal operation of the present sphere calorimeter the heat responses of both FIGS. 9 and 10 are recorded and the portions or areas under each curve are integrated to provide the total heat absorbed by each substrate. However, it is not necessary to run the secondary sphere water until all the heat is removed because of the predictability of the exponential decay.

The almost instantaneous response derived from the primary substrate provides a highly reliable measurement of total laser beam energy providing the calorimeter is operating in its intended manner, or in other words, providing the calorimeter is properly calibrated and its calibrations are undisturbed. More specifically, it has been noted that the primary substrate is designed to absorb into its coolant a particular fraction of the total beam energy and that the reliability of instantaneous primary measurements consequently depend to some extent upon whether this absorption factor is being maintained. In the present arrangement, however, this reliability is assured by the fact that integration of the thermal responses of both substrates provides a self-calibrating capability permitting a constant indication of the actual percentage of total heat being absorbed by the primary tubes. In other words, the amount of heat absorbed by the primary can be constantly compared with the total heat derived from the integration to determine if the actual percentage absorbed corresponds to the designed percentage and, as will be appreciated, such a comparison provides the important self-calibrating capability. In practice, if the self-calibration indicates a fault that may be due to a variety of circumstances, it is a simple matter to remedy the situation by substituting a new bank of primary tubes for the faulty one. The relatively simple structure of the calorimeter facilitates such a substitution.

In general, the present system provides almost instantaneous measurements of the power of extremely high energy beams and it also assures a safe handling of the high power without damage to the instrument or the beam source which may be an expensive laser. In addition, the utilization of the primary and secondary substrate measurements not only safely divides the beam power but also permits the important self-calibration that insures reliability of the measurements.

Obviously, many modifications and variations of the present invention are possible in the light of the above teachings. It is therefore to be understood that within the scope of the appended claims the invention may be practiced otherwise than as specifically described.

We claim:

1. A method of instantaneously determining the power of high energy laser beams comprising:
    directing the full laser beam intensity onto a thin-walled partially-reflective heat-conducting tubular substrate formed of a plurality of adjacently-disposed tube-like members,
    absorbing by heat-exchange a predetermined minor fraction of the full intensity in a coolant medium carried by (said tubular substrate) each of said tube-like members and reflecting the balance,
    said predetermined fraction being determined in accordance with the heat input needed to produce a temperature rise in said tubular coolant that is as instantaneous as possible within temperature limits consistent with maintaining the physical integrity of the substrate, and
    measuring said temperature rise for determining the full intensity laser beam power.

2. The method of claim 1 further including the step of capturing all specular rays reflected by said substrate on a laser-protecting secondary substrate.

3. The method of claim 1 wherein said coolant is provided by passing water through the tubular substrate.

4. The method of claim 3 further including the self-calibrating steps of:
absorbing by heat-exchange the heat produced said specular rays,
measuring the temperature rise produced by said specular ray absorption, and
integrating said measurement with said tubular substrate heat-exchange measurement; the relationship between said substrate and integrated measurements determining the actual fraction attributable to said tubular substrate heat-exchange whereby said actual fraction can be compared with said predetermined fraction for self-calibrating purposes.

5. The method of claim 4 further including the step of: evenly distributing said specular ray over the entire surface of the secondary substrate for protecting its physical integrity.

6. The method of claim 3 wherein said predetermined fraction is about 20 percent.

7. The method of claim 6 wherein said laser beam power is in excess of 100 kilowatts.

8. Calorimetric apparatus for measuring the power of high energy laser beams comprising:
a casing member provided with an inlet window for admitting a beam of a particular cross-sectional area,
a thin-walled heat-exchange tubular member formed of a plurality of adjacently-disposed tube-like members mounted in said casing for intercepting the full cross-sectional area of said admitted beam, said (tubular member) tube-like members having reflective surfaces disposed relative to said casing member for distributing all specularly-reflected rays over said casing,
fluid heat-exchanging coolant means for said tubular member,
said tubular member providing a passage for said coolant means with said member being adapted to conduct by heat-exchange a predetermined fraction of the full beam intensity as a heat-input into said coolant, said passage size and said fraction being determined in accordance with the heat input needed to produce a temperature-rise that is as instantaneous as possible consistent with the maintenance of the physical integrity of the tubular member, and
means for measuring said temperature rise of the coolant for determining the laser beam energy.

9. The apparatus of claim 8 wherein said casing is a thin-walled speroidal heat-exchange member and said tubular member is geometrically arranged for distributing specularly-reflected rays in an even manner over the interior surface of said spheroid, said apparatus further including:
coolant means in a heat-exchanging relationship with said casing whereby said specular rays produce a coolant temperature rise, and
means for measuring said specular ray temperature rise whereby it can be integrated with the tubular coolant measurement to permit a self-calibrating comparison of said predetermined fraction with the actual fraction of the integrated measurement represented by the tubular coolant measurement.

10. The apparatus of claim 9 wherein said tubular member is formed of a bank of elongate tubes disposed in close proximity one to the other with their longitudinal axes lying transversely across the path of travel of said beam, said tubes having arcuate beam-intercepting surfaces for evenly distributing said reflected rays into said spheroidal casing.

11. The apparatus of claim 10 wherein the longitudinal axes of each of said tubes is arcuately curved for providing a bank of tubes having a convex ray-distributing curvature relative to said beam path.

12. The apparatus of claim 11 further including:
means for mixing the coolant of each tube to provide an average coolant temperature rise, said average being measured by said measuring means.

13. The apparatus of claim 12 wherein said tubes are surface treated for achieving.

14. The apparatus of claim 12 wherein said coolant medium for said spheroidal casing is provided by a tubular arrangement disposed in heat-exchanging relationship over substantially the entire surface area of said casing, said apparatus further including:
means for mixing the tubular arrangement coolant to provide an average coolant temperature rise, said average being measured by said temperature measuring means.

15. The apparatus of claim 12 wherein each of said tubes is a copper tube clad with another metal material selected for regulating the heat input into the tube coolant.

16. The apparatus of claim 12 wherein each tube is formed with a core portion extending axially of its bore through its length for providing an attenuated coolant passage between the core and the inner wall of the tube.

* * * * *